United States Patent [19]

Seeman

[11] 3,900,733
[45] Aug. 19, 1975

[54] METHODS AND APPARATUS FOR MEASURING THE DENSITY OF GEOLOGICAL FORMATIONS

[75] Inventor: Bronislav Seeman, Meudon, France

[73] Assignee: Schlumberger Technology Corporation, New York, N.Y.

[22] Filed: Jan. 24, 1973

[21] Appl. No.: 326,379

[30] Foreign Application Priority Data
Jan. 24, 1972 France ............................ 72.02181
Dec. 11, 1972 France ............................ 72.43983

[52] U.S. Cl. ............................ 250/262; 250/252
[51] Int. Cl. ............................................ G01v 5/00
[58] Field of Search .......... 250/252, 253, 262, 268, 250/269

[56] References Cited
UNITED STATES PATENTS

| | | | |
|---|---|---|---|
| 2,956,165 | 10/1960 | Johnson | 250/261 |
| 2,978,583 | 4/1961 | Fearnside | 250/369 |
| 3,078,370 | 2/1963 | Monaghan | 250/268 |
| 3,521,063 | 7/1970 | Tittman | 250/268 X |
| 3,611,408 | 10/1971 | Shoemaker et al. | 250/252 X |

OTHER PUBLICATIONS

Wilkinson, "A Stabilizer for Proportional Counters," Journal of Scientific Instruments, No. 2, Feb. 1950, pp. 36–38.

Jordan et al., Compensation Automatique de L'Extinction de Fluorescence des Scintillateurs Liquides, 60, (1968), Nuclear Instruments and Methods, pp. 77–87, North–Holland Publishing Co., 1968.

Kowalski, Nuclear Electronics, 231, Springer–Verlag, N.Y., 1970.

*Primary Examiner*—Archie R. Borchelt

[57] ABSTRACT

In a tool for measuring the density of the geological formations traversed by a borehole, an apparatus corrects the effects of barite on the count rate of the pulses which are used for the density measurement and have an amplitude higher than a given threshold, by determining the deformations in the amplitude spectrum of these pulses and adjusting this threshold so as to compensate by the variation in the number of pulses taken into account, resulting from the adjustment, for the variation in the number of counted pulses resulting from the said deformations.

26 Claims, 8 Drawing Figures

METHODS AND APPARATUS FOR MEASURING THE DENSITY OF GEOLOGICAL FORMATIONS

BACKGROUND OF THE INVENTION

This invention relates to gamma-ray techniques for measuring the density of the geological formations traversed by a borehole. More particularly, it concerns methods for correcting the effects of the presence of barite in the borehole on the density measurements made therein, as well as the apparatus for implementing these methods.

Figure 1:
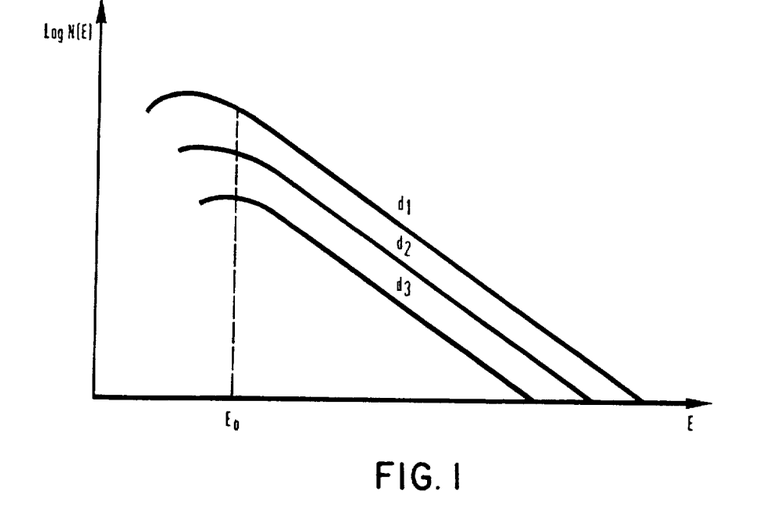
FIG. 1 shows the effect of variations in density on the spectrum of the gamma rays received by the main detector of a density measuring tool.

It is known that density measurements in boreholes are made by means of a tool which comprises a gamma-ray source and a radiation detector, generally a scintillation detector, placed about 40 cm from the source. The rays emitted by the source lose their energy in the surrounding geological formation mainly by collision with electrons and some of them reach the detector which thus records a count rate which is smaller in proportion as the number of electrons per unit volume in the formation is high. The density of the formation, which is related to the number of electrons, may thus be determined from this count rate. FIG. 1 shows, for three increasing values $d_1$, $d_2$ and $d_3$ of the density, the energy spectrum, in semilogarithmic coordinates, of the gamma rays reaching the detector, i.e., the curve giving the logarithm of the probability N(E) of picking up a ray of energy E, as a function of this energy. This FIGURE shows that the variations in density produce deformations in the part of the spectrum located below an energy level $E_o$ (between 180 and 220 keV), but that above this energy level, there are no longer any deformations. The detected gamma rays having an energy higher than $E_o$ maintain, whatever the density, the same spectral distribution and their number is a decreasing exponential function of the density. Accordingly, at the output of the detector account is taken only of pulses having an amplitude higher than a given threshold, hereinafter called the normal count threshold S, which corresponds to detected gamma rays having an energy higher than $E_o$. The recorded count rate thus furnishes the density measurement.

Use is generally made of an auxiliary radiation detector placed between the main detector and the source, about 20 cm from the latter, and used to correct the measurement furnished by the main detector. The gamma rays which reach the detector farthest from the source have in fact generally penetrated deeper into the formation than the gamma rays reaching the detector closest to the said source, so that the measurement furnished by the latter is affected more greatly by poor contact between the tool and the formation. This measurement is thus used to correct the measurement furnished by the main detector.

It is also known that during the drilling of a borehole it is frequently necessary to adjust the density of the drilling mud by the addition of barite. Consequently, the mudcake deposited on the walls of the borehole contains barite and this results in a distortion in the density measurements furnished by the tools hereinabove described. It can be seen in FIG. 2 that the form of the energy spectrum of the gamma rays reaching the main detector is influenced by the presence of barite in the mudcake. More precisely, it is seen that barite, owing to its high effective absorption section for low-energy gamma rays, produces a deformation in the spectrum which is practically imperceptible at high energies, but which is very marked at low energies. This deformation moreover increases as the barite content increases. Under these conditions, since account is taken only of the output pulses of the main detector, which correspond to gamma rays having an energy higher than $E_o$, it is seen that the barite lowers the recorded count rate. The value of the density deduced from this count rate is thus distorted. Unfortunately, this error cannot be corrected by the measurement furnished by the auxiliary detector because the latter works essentially in the part of the spectrum corresponding to the higher energies, which part is practically not influenced by the barite.

It is an object of the present invention to provide methods and associated apparatus allowing the correction of this error.

SUMMARY OF THE INVENTION

In accordance with these objects, methods are provided for correcting the effects of the barite contained in borehole mudcake on the main detector of a gamma-ray tool used for measuring the density of the geological formations traversed by a borehole, the said methods consisting mainly, when barite is present in the mudcake and deforms the amplitude spectrum of the pulses furnished by the detector, of modifying the threshold after which these pulses are taken into account to be used for density measurement, so that their count rate is not influenced by the deformations in their amplitude spectrum.

A first procedure consists of determining the deformations in the amplitude spectrum of the pulses from the detector having an amplitude higher than the normal count threshold S and of adjusting the said threshold so as to compensate, by the variation of the number of pulses taken into account as as a result of this adjustment, for the variation in the number of counted pulses resulting from these deformations. To achieve this, two solutions have been proposed. The first consists of determining the deviation between the means amplitude $A_M$ of the pulses having an amplitude higher than the threshold S and a reference value $A_{Mo}$ representing their mean amplitude for an undeformed spectrum, and then of adjusting the threshold so as to cancel this deviation. The other solution proposed consists of determining the deviation between the count rate $N_1$ of the pulses having an amplitude between the threshold S and a reference value $A_{mo}$ representing their median amplitude for an undeformed spectrum and the count rate $N_2$ of the pulses having an amplitude higher than this value, and then of adjusting the threshold so as to cancel this deviation. It should be pointed out immediately that this shifting of the normal count threshold S takes place within a range of about 10 keV only and that, consequently, the threshold will never be brought into the part of the spectrum deformed by the variations in density.

Let us point out that:

1. The mean amplitude $A_M$ of the pulses having an amplitude higher than the threshold S is defined by the classical relationship:

$$A_M = \frac{\int_S A \cdot N(A) \cdot dA}{\int_S N(A) \cdot dA}$$

where N(A) is the probability of obtaining a pulse of amplitude A.

2. The median amplitude $A_m$ of the pulses having an amplitude higher than a threshold S is the amplitude which divides into two parts of equal area the portion of their spectrum located over the threshold S; i.e., the count rate of the pulses having an amplitude between the threshold S and the median amplitude is thus equal to the count rate of the pulses having an amplitude higher than the median amplitude.

A second procedure consists, more simply, when the barite deforms the spectrum of the pulses delivered by the detector, of using as the count threshold for these pulses the median amplitude $A_{mo}$ of the pulses which are normally counted in the absence of deformations. An advantageous manner of achieving this consists of determining the ratio of the number of pulses having an amplitude between the normal count threshold S and the median amplitude $A_{mo}$ of the pulses having an amplitude higher than the said threshold to the number of pulses having an amplitude higher than the said median amplitude and, as long as this ratio remains near unity, of taking into account the pulses having an amplitude higher than the threshold S after having divided their count rate by two, but when the ratio becomes clearly lower than unity, of taking into account only the pulses having an amplitude higher than the median amplitude $A_{mo}$, without dividing their count rate by two.

Figure 2:
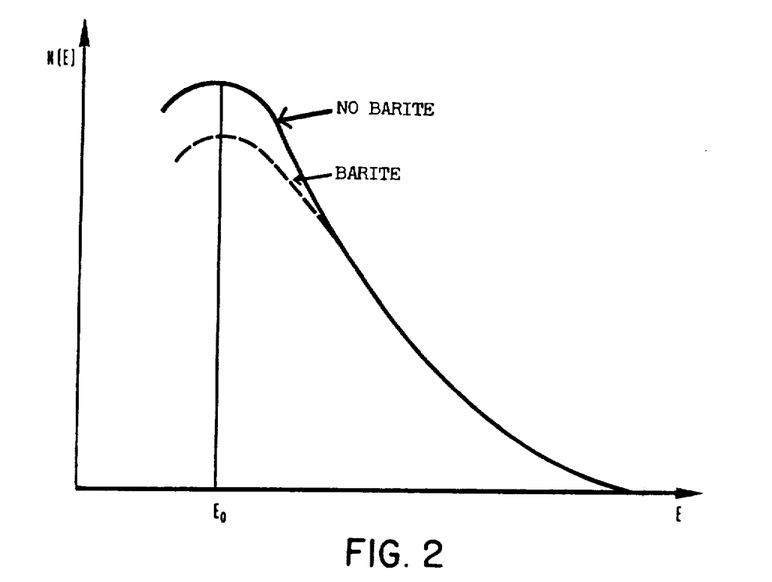
FIG. 2 shows the effect of barite on this spectrum.

To better understand this procedure, one need only recall that the presence of barite in the mudcake results, as shown in FIG. 2, in the sinking of the low-energy part of the spectrum; but that, by contrast, the high-energy part is practically not deformed. The proposed technique thus consists, when the barite added to the drilling mud deforms the spectrum and consequently distorts the density measurement, of eliminating the cause of the error by not taking into account the pulses of the deformed part of the spectrum, the upper limit of which is taken as the median amplitude $A_{mo}$ of the pulses having an amplitude higher than the normal threshold S. This median amplitude lies within a range corresponding to energies between 240 and 260 keV for threshold energies between 180 and 220 keV. This choice of $A_{mo}$ as a threshold in the presence of barite is perfectly acceptable. It has in fact been established that for a barite-produced drop of 10% in the count rate of the pulses having an amplitude lower than $A_{mo}$, the drop in the count rate of the pulses having an amplitude higher than $A_{mo}$ is lower than 0.5%. When the threshold is changed, the count rate of the pulses taken into account is roughly halved since, by definition, the count rate under $A_{mo}$ is equal to the count rate above. However, since in the absence of barite the count rate was divided by two and since this division is no longer performed, the effect of changing the threshold is not felt on the count rate of the pulses used for calculating the density.

The invention also providing apparatus for the implementation of the methods hereinabove described.

A first type of apparatus according to the invention comprises a voltage comparator having one input connected to receive the pulses generated by the detector and the other input connected to an adjustable reference voltage source defining the count threshold S, a monostable connected to the output of the said comparator, a gate having one input connected, via a delay circuit, to the output of the said detector and having the control input connected to the output of the said monostable, a circuit also connected to the output of the monostable and which is capable of producing calibrated pulses having a charge equal to and opposite that of a pulse from the detector having the reference amplitude $A_{Mo}$, and an integrator whose input is connected to the output of the said gate and also to that of the said circuit and whose output, which produces a continuous signal representative of the deviation between $A_{Mo}$ and the means amplitude $A_M$ of the pulses taken into account, is connected to the reference source to adjust the voltage which it delivers to the comparator, the pulses taken into account for the density calculation being taken at the output of the said monostable.

A second type of apparatus according to the invention comprises a first voltage comparator having one input connected to receive the voltages generated by the detector and the other input connected to an adjustable reference voltage source, defining the normal count threshold S, a second voltage comparator, one input of which is also connected to receive the output pulses from the detector and the other input of which is used to define the median reference amplitude $A_{mo}$, an anticoincidence logic connected to the outputs of these two comparators and adapted to generate a signal with two states the respective durations of which are proportional to the numbers $N_1/(N_1+N_2)$ and $N_2/(N_1+N_2)$, and an integrator whose input is connected to the output of the said logic and whose output, which produces a continuous signal representative of the deviation between the count rates $N_1$ and $N_2$, is connected to the first comparator, the pulses taken into account for the density calculation being taken at the output of the said first comparator.

Finally, a third type of apparatus according to the invention comprises a first voltage comparator whose reference is the normal count threshold S and which is connected to receive the pulses generated by the detector, a second voltage comparator whose reference is the median amplitude $A_{mo}$ and which is also connected to receive the pulses generated by the detector, an anticoincidence logic connected to the outputs of these two comparators and adapted to produce, on a first channel, an output pulse for any pulse from the detector having an amplitude between the said threshold and the said median amplitude and, on a second channel, an output pulse for any pulse from the detector having an amplitude higher than the median amplitude, an OR circuit with two inputs respectively connected to the said channels, a divide-by-two circuit connected to receive the pulses at the output of the said OR circuit, and a switch making it possible, when it occupies a first position in the absence of barite, to connect the output of the said divider circuit to the input of the density calculation stage and, when it occupies a second position in the presence of barite, to connect the said second channel to the input of this stage.

BRIEF DESCRIPTION OF THE DRAWINGS

Further features and objects of the present invention will appear from the following description of particularly advantageous embodiments, with reference to the appended drawings in which.

DESCRIPTION OF ILLUSTRATIVE EMBODIMENTS

Figure 3:
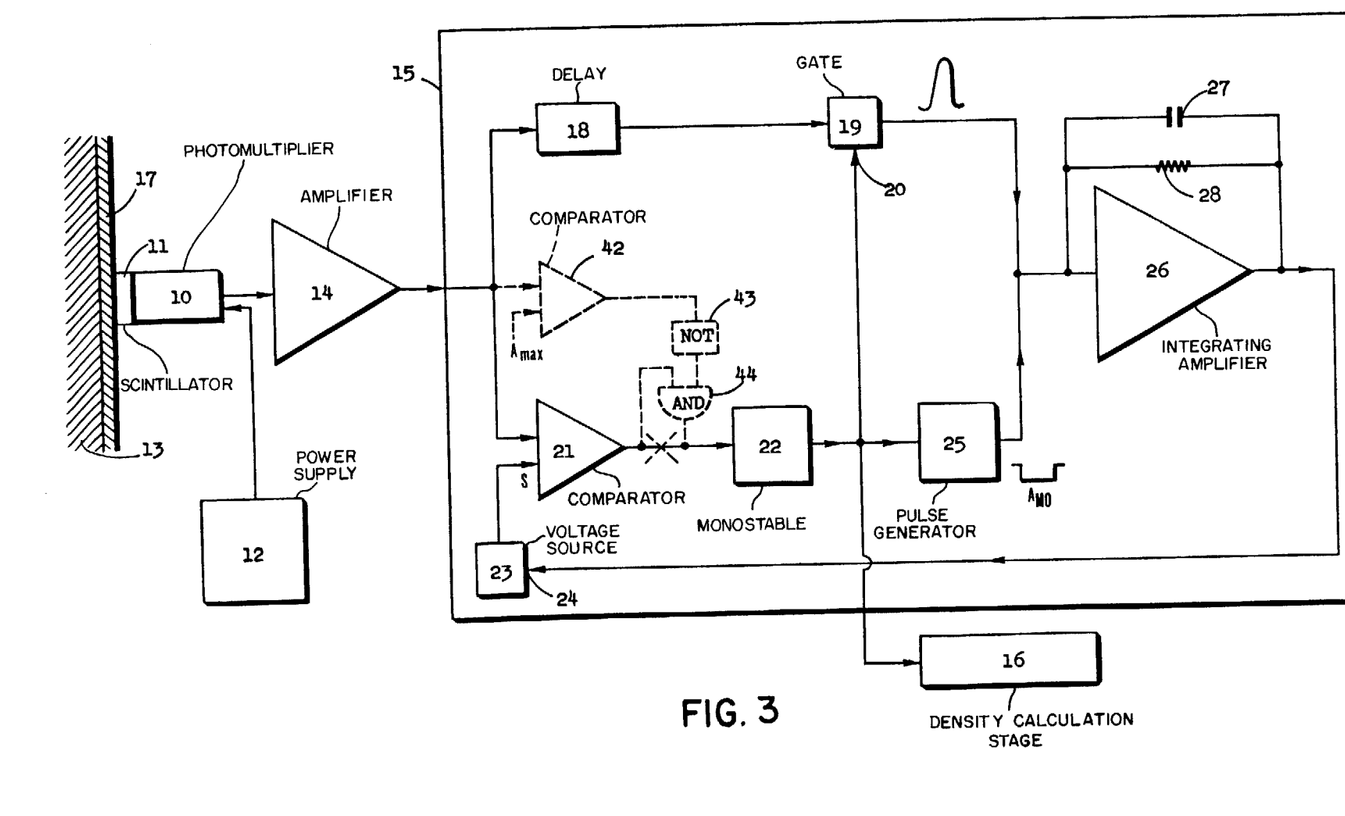
FIG. 3 is a schematic representation of a first apparatus according to the invention.

Referring now to FIG. 3, at 10 and 11 are shown respectively a photomultiplier and its scintillator which form the main detector of a tool for measuring the density of the geological formations penetrated by a borehole. The high-voltage power supply source of the photomultiplier 10 is shown at 12. The output pulses from the photomultiplier, which result from the detection of the gamma rays diffused by the surrounding formation 13, are first amplified at 14 before being introduced into an apparatus 15 whose role is:

to control the sending, to the density calculation stage 16, of pulses whose count rate, at it is shown, is a decreasing exponential function of the density of the formation;

to correct the effects, on this count rate, of the barite contained in the mudcake 17 deposited on the wall of the borehole and separating the detector from the formation.

In the apparatus 15, the pulses picked up at the output of the amplifier 14 are applied in parallel, on the one hand, to a delay circuit 18 followed by a gate 19 having a control input 20 and, on the other, to one of the inputs of a voltage comparator 21, followed by a monostable 22. The other input of the comparator 21 is connected to a voltage source 23 defining the normal count threshold S of the pulses, the level of this voltage being adjustable by a signal applied to a control input 24. The output of the monostable 22 is connected to the input of the calculation stage or scaler 16, to the control input 20 of the gate 19 and to the input of a circuit 25 designed to produce calibrated pulses having a charge equal to and opposite that of an output pulse from the amplifier 14, having a reference amplitude $A_{M_0}$, which is the mean amplitude, in the absence of barite, of pulses having an amplitude higher than the normal count threshold S. The output pulse from the monostable 22 is designed, when it appears, to open the gate 19 which is normally locked and, when it disappears, to trigger the circuit 25 which is normally at rest. The gate 19 and the circuit 25 have their outputs connected to the input of an amplifier 26 which operates as an integrator owing to a feedback loop formed by a capacitor 27 and a resistor 28 in parallel. The output from this amplifier-integrator is connected to the control input 24 of the source 23.

This apparatus operates in the following manner. The output pulses from the amplifier 14, whose amplitude is lower than the threshold S have no effect on the comparator 21. The monostable 22 thus remains in its stable state so that the stage 16 and the amplifier-integrator 26 do not receive any pulses. On the other hand, when the comparator 21 receives a pulse whose amplitude exceeds the threshold S, it delivers a pulse which triggers the monostable 22 to its active state. The latter then delivers a pulse to the stage 16 at the same time as the order to open the gate 19 which allows the passage to the amplifier 26 of the output pulse from the amplifier 14, responsible for triggering the comparator and transmitted by the circuit 18. The delay imposed upon the latter serves to guarantee that the order to open the gate 19 will always precede the pulse to be transmitted, whatever the amplitude of this pulse. The return of the monostable 22 to the stable state produces, on the one hand, the closing of the gate 19 and, on the other, the triggering of the circuit 25 which then applies its calibrated pulse to the input of the amplifier-integrator 26 where it thus follows the output pulse from the amplifier 14.

The amplifier-integrator 26, whenever it appears, at the output of the amplifier 14, a pulse having an amplitude higher than the threshold S, a first pulse which is this very pulse, and then a second pulse having a charge equal to and opposite that of an output pulse from the amplifier 14 having the reference amplitude $A_{M_0}$. Consequently, at the output of the integrator 26, we have a continuous voltage which represents at all times the deviation between the means amplitude $A_M$ of the pulses having an amplitude higher than the threshold S and the mean reference amplitude $A_{M_0}$. It is this voltage which, by action on the level of the source 23, will produce an adjustment of the threshold to maintain the equality between $A_M$ and $A_{M_0}$.

Figure 4:
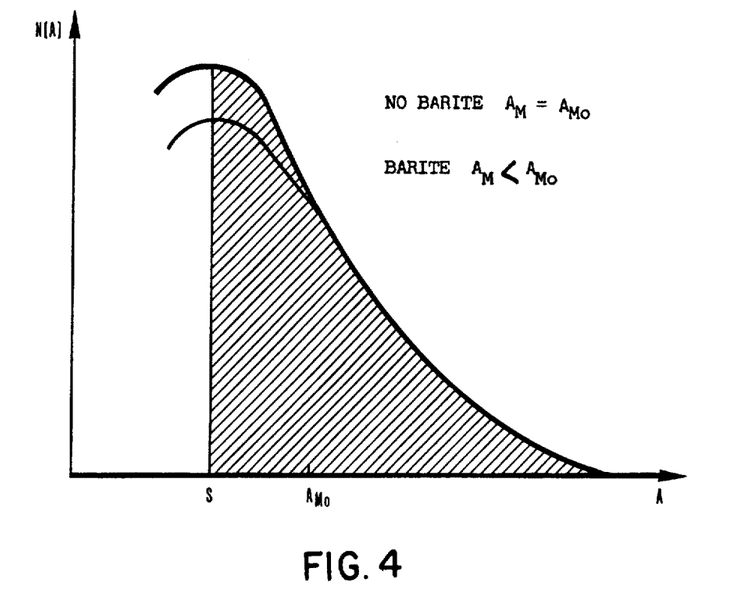
FIG. 4 explains the operation of the apparatus of FIG. 3.

Referring now to FIG. 4 which represents the amplitude spectrum of the output pulses from the amplifier 14 (i.e., the curve giving the probability N(A) of picking up a pulse having an amplitude A as a function of this amplitude), we see that when this spectrum is not deformed by the barite, with the mean amplitude $A_M$ conserving its reference value $A_{M_0}$, the deviation detected is zero and the reference voltage delivered to the comparator 21 by the source 23 remains unchanged. The normal count threshold S is consequently not modified either. By contrast, when the barite produces a sinking of the low-energy part of the spectrum, the mean amplitude $A_M$ of the pulses having an amplitude higher than S becomes lower than $A_{M_0}$. This results in a non-zero voltage at the output of the integrator 26, which lowers the level of the reference voltage delivered to the comparator 21, i.e., the count threshold S, to cancel the deviation between $A_M$ and $A_{M_0}$ and thus compensate the count rate recorded in the stage 16 for the deformation of the spectrum.

Figure 5:
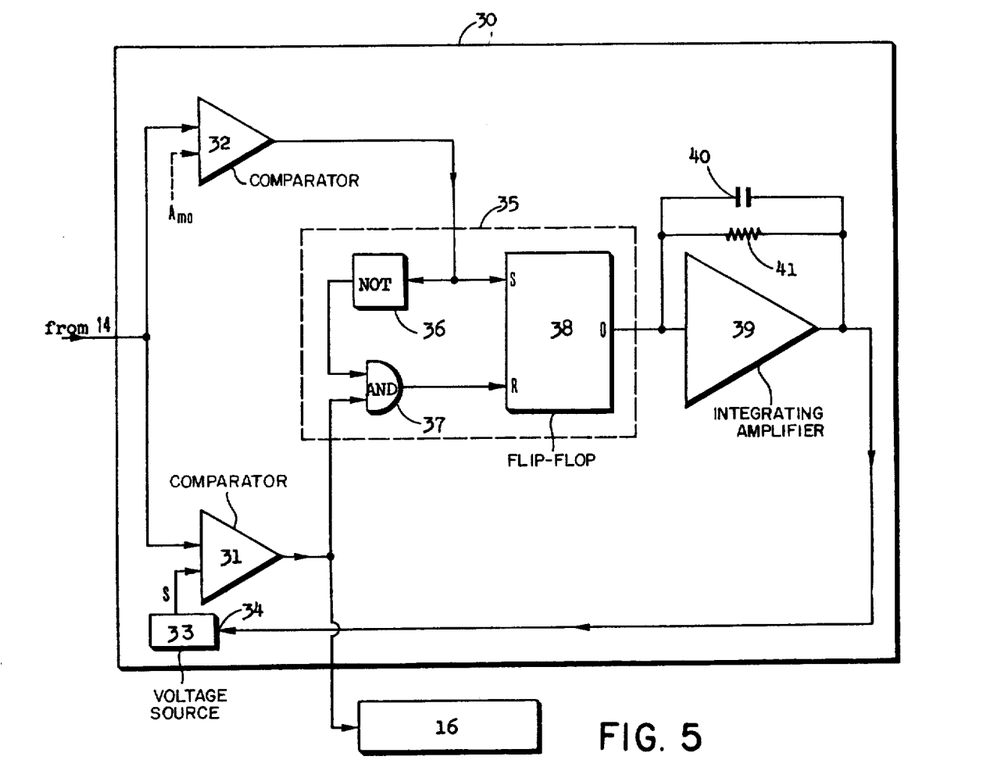
FIG. 5 is a schematic representation of a second apparatus according to the invention.

FIG. 5 shows, at 30, another embodiment of an apparatus according to the invention, which may be substituted for the apparatus 15 of FIG. 3. In this case, the pulses picked up at the output of the amplifier 14 are applied in parallel to the inputs of two voltage comparators 31 and 32 whose references are respectively the normal count threshold S and a reference amplitude $A_{m_0}$ representing the median amplitude, in the absence of barite, of the pulses having an amplitude higher than S. The threshold is defined by the voltage delivered by a source 33, its level being adjustable by means of a signal applied to a control input 34. The two comparators have their output connected to an anticoincidence logic 35 which includes an inverter circuit 36, and AND gate 37 and a flip-flop 38. The output from the comparator 32 is connected to the input S (set input) of the flip-flop 38 and, through the inverter circuit 36, to an input of the AND gate 37. The output of the comparator 31 is connected to the calculation stages 16 as well as to the other input of gate 37, whose output is connected to the input R (reset input) of the flip-flop. The output Q of this latter is connected to the input of an amplifier 39 operating as an integrator owing to its feedback loop formed by a capacitor 40 and a resistor 41 in parallel. The output of this amplifier is connected to the control input 34 of the voltage source 33.

This apparatus operates in the following manner. It is first of all apparent that the output pulses from the amplifier 14 having:

an amplitude lower than the threshold S have no effect on the comparators 31 and 32;

an amplitude higher than the threshold S but lower than the median amplitude $A_{mo}$ trigger the comparator 31, but have no effect on the comparator 32;

an amplitude higher than the median amplitude $A_{mo}$ trigger the two comparators.

Thus, at the output of the amplifier 14, the appearance of a pulse having an amplitude lower than S is not felt by the logic 35. On the other hand, when a pulse having an amplitude between S and $A_{mo}$ appears, the two inputs of the AND gate 37 are at 1 so that the flip-flop 38 receives at its input R a pulse which resets it. In the case of a pulse having an amplitude higher than $A_{mo}$, with the inputs of the AND gate 37 respectively at 1 and 0, it is the comparator 32 which applies to the input S of the flip-flop a pulse which sets it.

The flip-flop 38 is thus reset by the pulses having an amplitude between S and $A_{mo}$ and is set by pulses having an amplitude higher than $A_{mo}$. Consequently, the respective durations of the signal picked up at its output Q are proportional to $N_1/(N_1+N_2)$ and $N_2/(N_1+N_2)$, where $N_1$ is the count rate of the pulses having amplitudes between S and $A_{mo}$, and $N_2$ the count rate of pulses having amplitudes higher than $A_{mo}$. The amplifier 39 integrates this signal and delivers a continuous voltage which represents to all times the deviation between the count rates $N_1$ and $N_2$. It is this voltage which acts on the threshold S through the source 33 to maintain the equality between $N_1$ and $N_2$.

Figure 6:
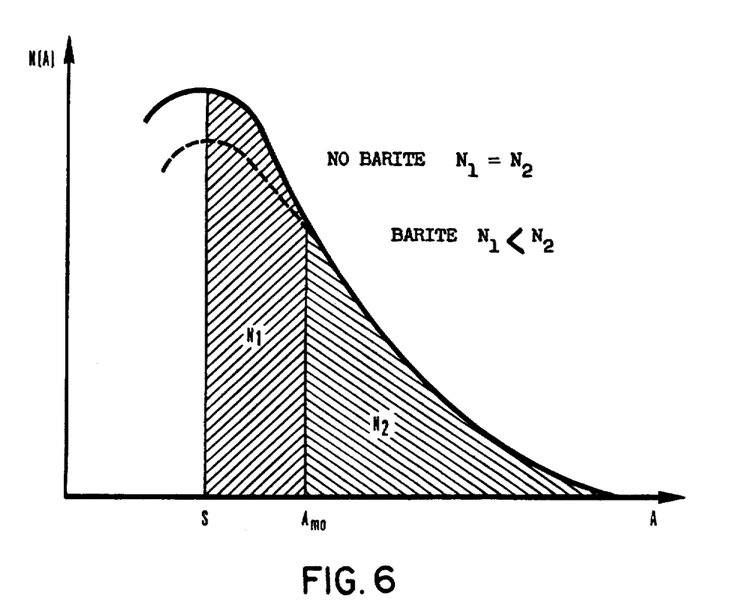
FIG. 6 explains the operation of the apparatus of FIG. 5.

Referring now to FIG. 6 which represents, like FIG. 4, the amplitude spectrum of the pulses delivered by the amplifier 14, we see that when this spectrum is not deformed by the barite, the median amplitude then conserving its reference value $A_{mo}$, the count rates $N_1$ and $N_2$ are equal and the reference voltage delivered to the comparator 31 by the source 33 remains unchanged. The count threshold S is consequently not modified either. On the other hand, when the barite produces a sinking in the low-energy part of the spectrum, the count rate $N_1$ becomes lower than the count rate $N_2$. This results in a non-zero voltage at the output of the integrator 39, which lowers the level of the reference voltage delivered to the comparator 31, i.e., the count threshold S, to cancel the deviation between $N_1$ and $N_2$. The count rate recorded in the stage 16 is consequently compensated for the deformation of the spectrum.

Figure 7:
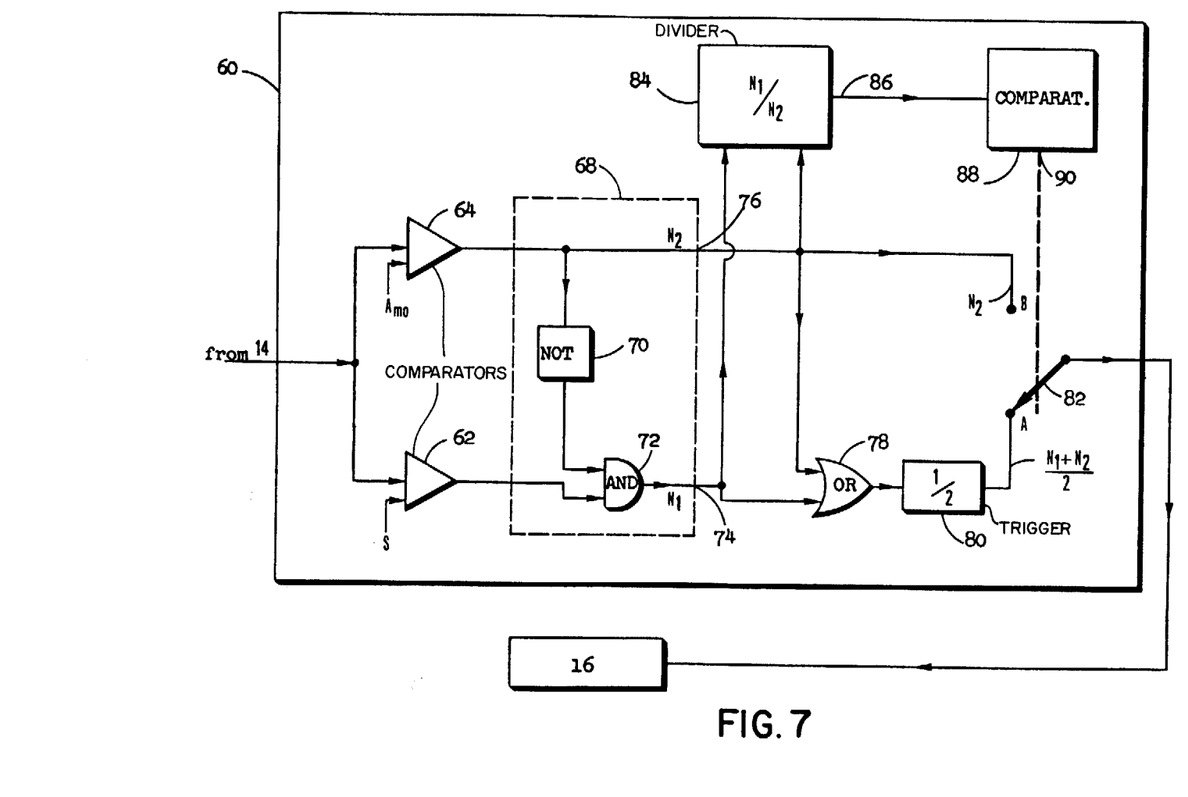
FIG. 7 is a schematic representation of a third apparatus according to the invention.

FIG. 7 represents, at 60 a third embodiment of an apparatus according to the invention. The pulses picked up at the output of the amplifier 14 are applied in parallel to the inputs of two voltage comparators 62 and 64 whose references are respectively the normal count threshold S and the median amplitude $A_{mo}$, in the absence of barite, of pulses having an amplitude higher than S.

These two comparators have their output connected to an anticoincidence logic 68 composed very simply of an inverter circuit 70 and of a two-input AND gate 72. The output of the comparator 64 is connected, via the inverter 70, to one of the inputs of the AND gate 72, whereas the output of the comparator 62 is connected to the other input of this gate. The two outputs 74 and 76 of this logic, consisting respectively of the output of the AND gate 72 and that of the comparator 64, produce, as will be explained hereinbelow, pulse trains corresponding to the pulses delivered by the amplifier, whose amplitudes are respectively between S and $A_{mo}$ and higher than $A_{mo}$.

The two outputs 74 and 76 of the logic 68 are connected to the two inputs of an OR gate 78 whose output is connected, via a trigger 80, to a terminal A. The output 76 is moreover connected directly to a terminal B. A switch 82 with two positions makes it possible to connect either of these two terminals to the input of the scaler 16. The two outputs 74 and 76 of the logic 68 are also applied to the input of a divider circuit 84 adapted to deliver, at its output 86, a signal representative of the ratio $N_1/N_2$, where $N_1$ is the count rate of the pulses produced at the output 74 (amplitude between S and $A_{mo}$) and $N_2$ that of the pulses produced at the output 76 (amplitude higher than $A_{mo}$). This signal is applied to the input of a comparator 88 whose output 90 controls the switch 82. As long as the ratio $N_1/N_2$, remaining near unity, does not fall below a threshold which may be set at 0.95, the switch is maintained in the position shown, but as soon as this ratio becomes lower than this threshold, the switch goes over to the other position.

The apparatus just described operates in the following manner. It is first of all apparent that the output pulses from the amplifier 14 having:

an amplitude lower than the threshold S have no effect on the comparators 62 and 64;

an amplitude higher than the threshold S, but lower than the median amplitude $A_{mo}$, trigger the comparator 62 but have no effect on the comparator 64;

an amplitude higher than the median amplitude $A_{mo}$ trigger the two comparators.

Thus, we see immediately that the output 74 of the logic 68 will deliver a pulse for every output pulse from the amplifier 14 having an amplitude between S and $A_{mo}$ and that the output 76 will deliver a pulse for every output pulse from the amplifier having an amplitude higher than $A_{mo}$. Thus, as already mentioned, the count rate $N_1$ of the pulses at the output 74 will correspond to the produced pulses having an amplitude between S and $A_{mo}$ whereas the count rate $N_2$ at the output 76 will correspond to the pulses having an amplitude higher than $A_{mo}$.

The divider circuit 84 calculates the ratio $N_1/N_2$ of these two count rates and the comparator 88 compares its value with 0.95. As long as this ratio remains higher than 0.95, i.e. as long as the two count rates are approximately the same (reflecting the fact that the spectrum does not undergo any significant sinking due to barite in its portion located below the median amplitude $A_{mo}$), the comparator 88 maintains the switch 82 in the position shown in FIG. 7. Thus, the input of the scaler 16 is connected to the output of the trigger 80 which receives from the OR gate 78 the two combined pulse trains produced by the logic 68 and, acting as a divide-by-two circuit, thus delivers a pulse train whose count rate is equal to half the sum of the count rates $N_1$ and $N_2$ of these two pulse trains. Since $N_1$ and $N_2$ are then substantially equal, the count rate recorded by the scaler is equal to $N_2$. On the other hand, when the ratio $N_1/N_2$ becomes lower than 0.95 (which reflects the fact that the barite contained in the mudcake has produced a non-negligible sinking of the portion of the spectrum located over $A_{mo}$), the comparator 88 makes the switch 82 go over to the other position so that it is then the output 76 of the logic 68 which is connected to the input of the scaler 16. The latter consequently now receives only the pulses having an amplitude higher than the median amplitude $A_{mo}$ and consequently records a count rate equal to $N_2$. Thus, the change-over of the switch 82 does not have an effect on the count rate recorded by the scaler 16, which remains equal to $N_2$.

Coming back now to FIG. 6, we see that:

a. When the spectrum is not deformed (ratio $N_1/N_2$ near unity), the count threshold of the pulses used for calculating the density is the amplitude S; the count rate of these pulses is then divided by two.

b. When the barite deforms the low-energy part of the spectrum (ratio $N_1/N_2$ lower than unity), the count threshold is the median amplitude $A_{mo}$ of the pulses having an amplitude higher than S; the count rate is thus no longer divided by two, so that the shift in the threshold does not modify the recorded count. Thus, account is not taken of the pulses having an amplitude between the normal count threshold S and the median amplitude $A_{mo}$ which correspond to the deformed part of the spectrum and which would thus distort the density measurement. Of course, this division by two of the number of pulses used multiplies the statistical error by 2, but it is noted that in reality the error due to the raising of the threshold is negligible compared with that which would be made without taking the barite into account.

It is to be noted that in a simplified version of the apparatus shown in FIG. 7, it would be possible to eliminate the divider circuit 84 and the comparator 88, the switch 82 then being actuated manually by the operator in accordance with the amount of barite introduced into the borehole.

It is evident that the three apparatus described hereinabove will provide a valid correction of the effects of barite only if the gain of the detection system is perfectly stabilized. When this stabilization is achieved by associating with the detector a luminous or radioactive source designed to produce a reference peak in the high-energy portion of the spectrum, it is essential not to use the pulses due to this source for calculating the density.

The apparatus of FIG. 3 can then be modified by adding, as shown in broken lines, a voltage comparator 42, an inverter circuit 43 and an AND gate 44. The comparator 42 is connected, like the comparator 21, to the output of the amplifier 14 and its reference is the amplitude $A_{max}$ beyond which the pulses delivered by this amplifier must no longer be taken into account because they are due to the reference source. The AND gate 44 which then supplies the monostable 22 has one input connected directly to the output of the comparator 21 and the other input connected to the output of the comparator 42 via the inverter circuit 43, so that the pulses having an amplitude lower than the threshold S or higher than $A_{max}$ have no effect on the monostable 22 which will go over to its active state only on the appearance of a pulse having an amplitude between S and $A_{max}$.

Figure 8:
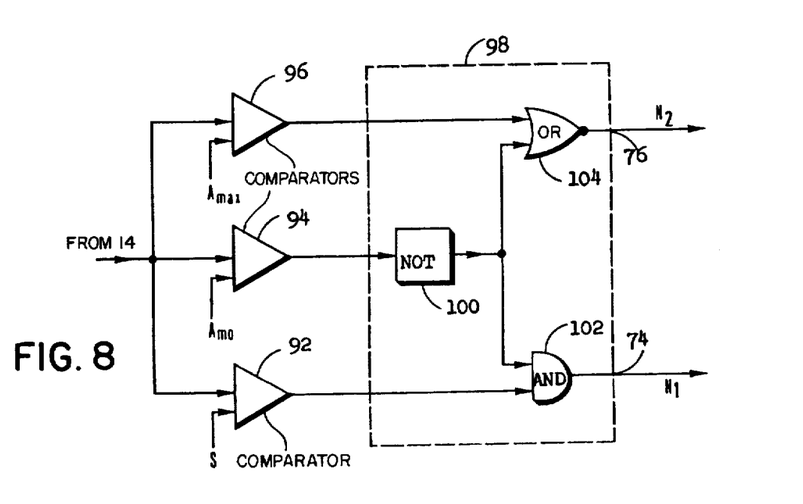
FIG. 8 illustrates another embodiment of part of the apparatus of FIG. 7.

FIG. 8 shows the modifications which must be made in the apparatus of FIG. 7 when no account is to be taken of pulses having an amplitude higher than $A_{max}$. The pulses picked up at the output of the amplifier 14 are then applied in parallel to the inputs of three voltage comparators 92, 94 and 96 whose references are respectively the amplitudes S, $A_{mo}'$ and $A_{max}$, the amplitude $A_{mo}'$ being the median amplitude of the pulses having amplitudes between S and $A_{max}$. As this maximum amplitude is naturally chosen as large as possible, the area of the normal spectrum (due to the rays coming from the formation) undergoes a relatively small decrease so that the median amplitude $A_{mo}'$ is not very different from the amplitude $A_{mo}$.

The anticoincidence logic 68 of FIG. 7 is then replaced by the logic 98 which includes an inverter circuit 100, and AND gate 102, and a NOR circuit 104. The output of the comparator 94 is connected, via the inverter circuit 100, to an input of the AND gate 102 and to an input of the NOR circuit 104. The output of the comparator 92 is connected to the other input of the AND gate and that of the comparator 96 to the other input of the NOR circuit. It is thus easy to see that the AND gate 102 delivers a pulse for every output pulse from the amplifier 14 having an amplitude between S and $A_{mo}'$ and that the output of the NOR circuit 104 delivers a pulse for every output pulse from the amplifier having an amplitude between $A_{mo}'$ and $A_{max}$. The output of the AND gate 102 and the output of the NOR circuit 104 thus constitute the outputs 74 and 76 respectively of the apparatus of FIG. 7.

As regards the apparatus of FIG. 5, it will be modified by adding a third voltage comparator (not shown) whose reference is the amplitude $A_{max}$, the reference of the comparator 32 then being the median amplitude $A_{mo}'$ of the pulses having amplitudes between S and $A_{max}$. The three comparators are associated, like the comparators 92, 94 and 96 of FIG. 8, with the logic 98 whose outputs 74 and 76 are connected to the inputs R and S respectively of the flip-flop 38. In this case, the calculation stage 16 must be supplied, no longer directly by the comparator 31, but through an AND gate (not shown) one input of which is connected to the output of the comparator 31 and the other input to the output of the third comparator, via an inverter circuit (not shown).

What is claimed is:

1. A method of correcting borehole barite effects on gamma radiation detected from a formation of interest to determine a formation characteristic free of barite distortion comprising the steps of:
   deriving a plurality of spectra of detected gamma radiation energies that are representative of detected formation gamma radiation and exceed a threshold energy value; and
   comparing the spectra with one another to produce an output signal representative of a predetermined relationship therebetween to enable determination from the output signal of an adjusted threshold energy value corresponding to a minimum energy level for a formation characteristic determining spectra that results in the correction of borehole barite effects on the spectra of detected gamma radiation.

2. A method according to claim 1 and further including the steps of:
   determining the adjusted threshold energy value; and
   selecting only those detected gamma radiation energies above then adjusted threshold energy value to correct borehole barite effects on detected gamma radiation.

3. A method of correcting borehole barite effects on gamma radiation detected from a formation of interest to determine a formation characteristic free of barite distortion comprising the steps of:
   comparing gamma radiation energies detected from a formation of interest to a threshold energy value to produce a first signal representative of a first spectrum of detected gamma radiation that exceeds the threshold energy value;
   comparing the first signal to a reference signal representative of formation gamma radiation in the absence of borehole barite to produce a second signal representative of a variation from a predetermined relationship therebetween; and
   adjusting the threshold energy value in response to the second signal to correct borehole barite effects on detected gamma radiation so that a formation characteristic free of barite distortion can be determined.

4. A method according to claim 3 wherein the reference signal is representative of the mean amplitude of a second spectrum of gamma radiation that exceeds the threshold energy value, the second spectrum being representative of formation gamma radiation in the absence of borehole barite.

5. A method according to claim 3, wherein said first comparing step comprises comparing gamma radiation energies detected from a formation of interest to a threshold energy value to produce an electrical output representative of detected gamma radiation that exceeds the threshold energy value and, in response to the electrical output, to produce a first signal representative of a first spectrum of detected gamma radiation that exceeds the threshold energy value.

6. A method according to claim 3, wherein the reference signal is representative of the median amplitude of a second spectrum of gamma radiation that exceeds the threshold energy value, the second spectrum being representative of formation gamma radiation in the absence of borehole barite.

7. A method according to claim 3, wherein said second comparing step comprises:
   comparing gamma radiation energies detected from a formation of interest to a reference signal representative of a second spectrum of gamma radiation that exceeds the threshold energy value, the second spectrum being representative of formation gamma radiation in the absence of borehole barite, to produce a first intermediate signal representative of a spectrum of gamma radiation that exceeds the reference amplitude and is free of borehole barite distortion;
   combining the first signal and the first intermediate signal to produce a second intermediate signal representative of detected gamma radiation pulses between the threshold energy value and the reference amplitude; and
   comparing the first intermediate signal to the second intermediate signal to produce a second signal representative of a variation from a predetermined relationship therebetween.

8. A method according to claim 3, wherein said second comparing step comprises:
   comparing gamma radiation energies detected from a formation of interest to a reference signal representative of a second spectrum of gamma radiation that exceeds the threshold energy value, the second spectrum being representative of formation gamma radiation in the absence of borehole barite, to produce a first intermediate signal representative of a spectrum of gamma radiation that exceeds the reference amplitude and is free of borehole barite distortion;
   combining the first signal and the first intermediate signal to produce a second intermediate signal representative of detected gamma radiation pulses between the threshold energy value and the reference amplitude; and
   comparing the first intermediate signal to the second intermediate signal to produce a second signal representative of a variation from a predetermined relationship therebetween; and further wherein said adjusting step comprises selecting either one of the first signal or, in response to the second signal, the first intermediate signal so that borehole barite effects are corrected for in the selected of the two signals and a formation characteristic free of barite distortion can be determined from the selected of the first signal and the first intermediate signal.

9. A method according to claim 3 and further including, after said first comparison step, the step of comparing the detected gamma radiation energies to a cut-off energy value representative of a maximum energy level for a formation characteristic determining spectra to produce an inhibiting signal representative of detected gamma radiation that exceeds the cut-off value for provision to said circuit means and wherein said second step comparison of said first signal to said reference signal is inhibited in response to said inhibiting signal.

10. A method of correcting borehole barite effects on gamma radiation detected from a formation of interest to determine a formation characteristic free of barite distortion comprising the steps of:
   generating a threshold energy value representative of a minimum energy level for gamma radiation detected from a formation;
   comparing gamma radiation energies detected from a formation of interest to the threshold energy value to produce an electrical output representative of detected gamma radiation that exceeds the threshold energy value;
   comparing, in response to the electrical output, a first signal representative of detected gamma radiation and a reference signal representative of a second spectrum of gamma radiation pulses that exceed the threshold energy value, the second spectrum being representative of formation gamma radiation in the absence of borehole barite, to produce a second signal representative of a variation from a predetermined relationship therebetween; and
   adjusting the threshold energy value in response to the second signal to conform the first signal and the reference signal to the predetermined relationship so that borehole barite effects on the electrical output are corrected and a formation characteristic free of barite distortion can be determined.

11. A method of correcting borehole barite effects on gamma radiation detected from a formation of interest to determine a formation characteristic free of barite distortion comprising the steps of:

generating a threshold energy value representative of a minimum energy level for gamma radiation detected from a formation;

comparing gamma radiation energies detected from a formation of interest to the threshold energy value to produce a first signal representative of a first spectrum of detected gamma radiation that exceeds the threshold energy value;

comparing gamma radiation energies detected from a formation of interest to a reference signal representative of a second spectrum of gamma radiation that exceeds the threshold energy value, the second spectrum being representative of formation gamma radiation in the absence of borehole barite, to produce a first intermediate signal representative of a spectrum of gamma radiation that exceeds the reference amplitude and is free of borehole barite distortion;

combining the first signal and the first intermediate signal to produce a second intermediate signal representative of detected gamma radiation pulses between the threshold energy value and the reference amplitude;

comparing the first intermediate signal to the second intermediate signal to produce a second signal representative of a variation from a predetermined relationship therebetween; and adjusting the threshold energy value in response to the second signal to conform the first and second intermediate signals to the predetermined relationship so that borehole barite effects on the first signal are corrected and a formation characteristic free of barite distortion can be determined.

12. A method of correcting borehole barite effects on gamma radiation detected from a formtion of interest to determine a formation characteristic free of barite distortion comprising the steps of:

generating a threshold energy value representative of a minimum energy level for gamma radiation detected from a formation;

comparing gamma radiation energies detected from a formation of interest to the threshold energy value to produce a first signal representative of a first spectrum of detected gamma radiation that exceeds the threshold energy value;

comparing gamma radiation energies detected from a formation of interest to a reference signal representative of a second spectrum of gamma radiation that exceeds the threshold energy value, the second spectrum being representative of formation gamma radiation in the absence of borehole barite, to produce a first intermediate signal representative of a spectrum of gamma radiation that exceeds the reference amplitude and is free of borehole barite distortion;

combining the first signal and the first intermediate signal to produce a second intermediate signal representative of detected gamma radiation pulses between the threshold energy value and the reference amplitude;

comparing the first intermediate signal to the second intermediate signal to produce a second signal representative of a variation from a predetermined relationship therebetween; and selecting either one of the first signal or, in response to the second signal, the first intermediate signal so that borehole barite effects are corrected for in the selected of the two signals and a formation characteristic free of barite distortion can be determined from the selected of the first signal and the first intermediate signal.

13. Apparatus for correcting borehole barite effects on gamma radiation detected from a formation of interest to obtain a formation characteristic free of barite distortion comprising:

means for deriving a plurality of spectra of detected gamma radiation energies that are representative of detected formation gamma radiation and exceed a threshold energy value; and means connected to said spectra deriving means for comparing said spectra with one another to produce an output signal representative of a predetermined relationship therebetween to enable determination from said output signal of an adjusted threshold energy value corresponding to a minimum energy level for a formation characteristic determining spectra that results in the correction of borehole barite effects on said detected gamma radiation spectra so that a formation characteristic functionally dependent on detected gamma radiation and free of barite distortion can be obtained.

14. Apparatus according to claim 13, further including means for determining said adjusted threshold energy value including means for selecting only those detected gamma radiation energies above said adjusted threshold energy value to correct borehole barite effects on detected gamma radiation.

15. Apparatus for correcting borehole barite effects on gamma radiation detected from a formation of interest to determine a formation characteristic free of barite distortion comprising:

first comparison means for comparing gamma radiation energies detected from a formation of interest to a threshold energy value to produce a first signal representative of a first spectrum of detected gamma radiation that exceeds said threshold energy value;

circuit means connected to said first comparison means for comparing said first signal to a reference signal representative of formation gamma radiation in the absence of borehole barite to produce a second signal representative of a variation from a predetermined relationship therebetween; and means connected to said circuit means for adjusting said threshold energy value in response to said second signal to correct borehole barite effects on detected gamma radiation so that a formation characteristic free of barite distortion can be determined.

16. Apparatus according to claim 15, wherein said reference is signal is representative of the mean amplitude of a second spectrum of gamma radiation that exceeds said threshold energy value, said second spectrum being representative of formation gamma radiation in the absence of borehole barite.

17. Apparatus according to claim 15, wherein said first comparison means comprises means for comparing gamma radiation energies detected from a formation of interest to a threshold energy value to produce an electrical output representative of detected gamma radiation that exceeds said threshold energy value and, in response to said electrical output, to produce a first signal representative of a first spectrum of detected gamma radiation that exceeds said threshold energy value.

18. Apparatus according to claim 15, wherein said reference signal is representative of the median amplitude of a second spectrum of gamma radiation that exceeds said threshold energy value, said second spectrum being representative of formation gamma radiation in the absence of borehole barite.

19. Apparatus according to claim 15, wherein said second comparison means comprises:

means for comparing gamma radiation energies detected from a formation of interest to a reference signal representative of a second spectrum of gamma radiation that exceeds said threshold energy value, said second spectrum being representative of formation gamma radiation in the absence of borehole barite, to produce a first intermediate signal representative of a spectrum of gamma radiation that exceeds said reference amplitude and is free of borehole barite distortion;

first circuit means connected to said first and second comparison means for combining said first signal and said first intermediate signal to produce a second intermediate signal representative of detected gamma radiation pulses between said threshold energy value and said reference amplitude; and second circuit means connected to said first comparison means and said first circuit means for comparing said first intermediate signal to said second intermediate signal to produce a second signal representative of a variation from a predetermined relationship therebetween.

20. Apparatus according to claim 15, wherein said second comparison means comprises:

means for comparing gamma radiation energies detected from a formation of interest to a reference signal representative of a second spectrum of gamma radiation that exceeds said threshold energy value, said second spectrum being representative of formation gamma radiation in the absence of borehole barite, to produce a first intermediate signal representative of a spectrum of gamma radiation that exceeds the reference amplitude and is free of borehole barite distortion;

first circuit means connected to said first and second comparison means for combining said first signal and said first intermediate signal to produce a second intermediate signal representative of detected gamma radiation pulses between said threshold energy value and said reference amplitude; and second circuit means connected to said first comparison means and said first circuit means for comparing said first intermediate signal to said second intermediate signal to produce a second signal representative of a variation from a predetermined relationship therebetween; and further wherein said adjusting means comprises means connected to said second circuit means for selecting either one of said first signal or, in response to said second signal, said first intermediate signal so that borehole barite effects are corrected for in the selected of said two signals and a formation characteristic free of barite distortion can be determined from the selected of said first signal and said first intermediate signal.

21. Apparatus according to claim 15, further including means for generating said threshold energy value for provision to said first comparison means, said threshold energy value being representative of a minimum energy level for a formation characteristic determining spectra that results in the correction of borehole barite effects on the spectra of detected gamma radiation energies, and wherein said comparison means is connected to said generating means.

22. Apparatus according to claim 15, wherein said adjusting means is connected to said circuit means and said generating means for adjusting said threshold energy value.

23. Apparatus according to claim 15, further including second comparison means for comparing said detected gamma radiation energies to a cut-off energy value representative of a maximum energy level for a formation characteristic determining spectra to produce an inhibiting signal representative of detected gamma radiation that exceeds said cut-off value for provision to said circuit means and wherein said circuit means is connected to said first and second comparison means and further includes means for inhibiting comparison of said first signal to said reference signal in response to said inhibiting signal.

24. Apparatus for correcting borehole barite effects on gamma radiation detected from a formation of interest to determine a formation characteristic free of barite distortion comprising:

means for generating a threshold energy value representative of a minimum energy level for gamma radiation detected from a formation;

means connected to said generating means for comparing gamma radiation energies detected from a formation of interest to said threshold energy value to produce an electrical output representative of detected gamma radiation that exceeds said threshold energy value;

circuit means connected to said comparison means for comparing, in response to said electrical output, a first signal representative of detected gamma radiation and a reference signal representative of a second spectrum of gamma radiation pulses that exceed the threshold energy value, the second spectrum being representative of formation gamma radiation in the absence of borehold barite, to produce a second signal representative of a variation from a predetermined relationship therebetween; and means connected to said circuit means for adjusting said threshold energy value in response to said second signal to conform said first signal and said reference signal to said predetermined relationship so that borehole barite effects on said electrical output are corrected and a formation characteristic free of barite distortion can be determined.

25. Apparatus for correcting borehole barite effects on gamma radiation detected from a formation of interest to determine a formation characteristic free of barite distortion comprising:

means for generating a threshold energy value representative of a minimum energy level for gamma radiation detected from a formation;

first comparison means connected to said generating means for comparing gamma radiation energies detected from a formation of interest to said threshold energy value to produce a first signal representative of a first spectrum of detected gamma radiation that exceeds said threshold energy value;

second comparison means for comparing gamma radiation energies detected from a formation of interest to a reference signal representative of a second spectrum of gamma radiation that exceeds said threshold energy value, said second spectrum being representative of formation gamma radiation in the absence of borehold barite, to produce a first intermediate signal representative of a spectrum of gamma radiation that exceeds said reference amplitude and is free of borehole barite distortion;

first circuit means connected to said first and second comparison means for combining said first signal and said first intermediate signal to produce a second intermediate signal representative of detected gamma radiation pulses between said threshold energy value and said reference amplitude;

second circuit means connected to said first comparison means and said first circuit means for comparing said first intermediate signal to said second intermediate signal to produce a second signal representative of a variation from a predetermined relationship therebetween; and means connected to said second circuit means for adjusting said threshold energy value in response to said second signal to conform said first and second intermediate signals to said predetermined relationship so that borehole barite effects on said first signal are corrected and a formation characteristic free of barite distortion can be determined.

26. Apparatus for correcting borehole barite effects on gamma radiation detected from a formation of interest to determine a formation characteristic free of barite distortion comprising:

first comparison means for comparing gamma radiation energies detected from a formation of interest to a threshold energy value to produce a first signal representative of a first spectrum of detected gamma radiation that exceeds said threshold energy value;

second comparison means for comparing gamma radiation energies detected from a formation of interest to a reference signal representative of a second spectrum of gamma radiation that exceeds said threshold energy value, said second spectrum being representative of formation gamma radiation in the absence of borehole barite, to produce a first intermediate signal representative of a spectrum of gamma radiation that exceeds the reference amplitude and is free of borehole barite distortion;

first circuit means connected to said first and second comparison means for combining said first signal and said first intermediate signal to produce a second intermediate signal representative of detected gamma radiation pulses between said threshold energy value and said reference amplitude;

second circuit means connected to said first comparison means and said first circuit means for comparing said first intermediate signal to said second intermediate signal to produce a second signal representative of a variation from a predetermined relationship therebetween; and means connected to said second circuit means for selecting either one of said first signal or, in response to said second signal, said first intermediate signal so that borehole barite effects are corrected for in the selected of said two signals and a formation characteristic free of barite distortion can be determined from the selected of said first signal and said first intermediate signal.

* * * * *